W. F. SCHATZ.
Hold Back.
No 106,732. Patented Aug. 23, 1870.
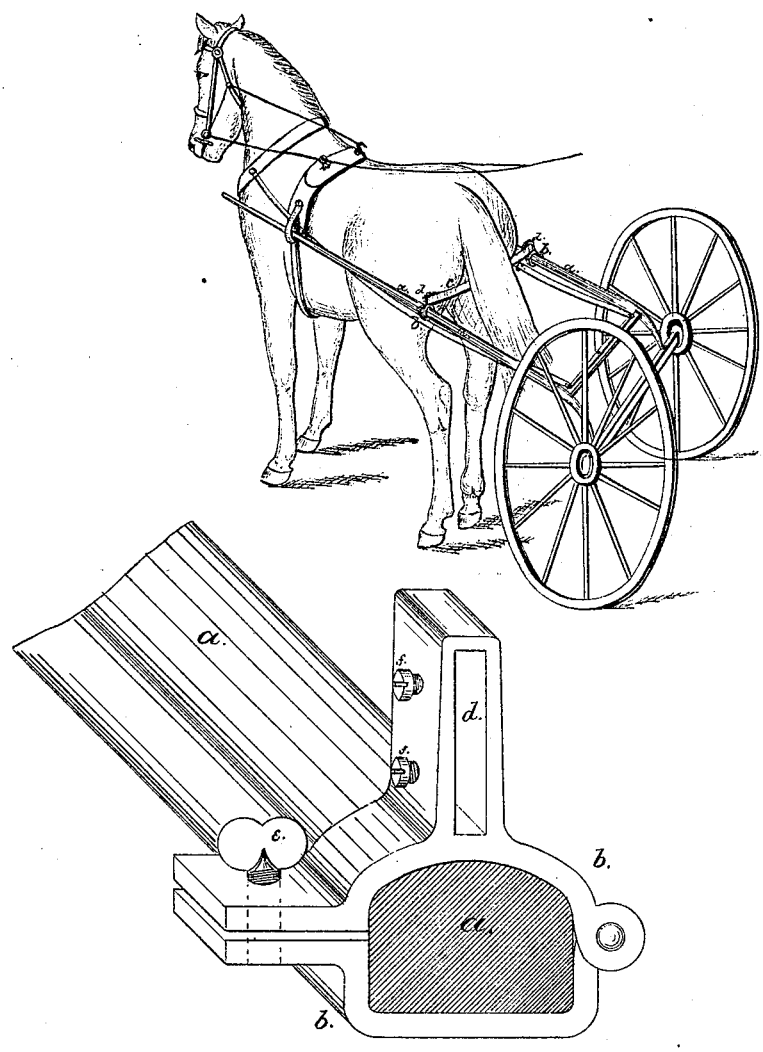

United States Patent Office.

WILLIAM F. SCHATZ, OF COLUMBUS, OHIO.

Letters Patent No. 106,732, dated August 23, 1870.

---

IMPROVEMENT IN BREECHING ATTACHMENT FOR HORSES.

The Schedule referred to in these Letters Patent and making part of the same

---

*To all whom it may concern:*

Be it known that I, WILLIAM F. SCHATZ, of Columbus, Franklin county, Ohio, have invented a new and improved Breeching Attachment for Horses, consisting of two shiftable metallic clasps and loops and a stout elastic breechen, fastened to and connecting the same or otherwise affixed to the shafts of the vehicle; and I declare that the following is a full and exact description thereof, reference being had to the accompanying drawing and to the letters of reference marked thereon.

My invention consists of two solid metallic clasps $b\ b$ and loops $d\ d$, tightly fastened to the rear part of the shafts of the vehicle by thumb-screws, E, or otherwise, at a point, that the breechen connecting them barely touches the legs of the horse, and so constructed as to be adjustable to shafts of any size.

They are connected with each other by a stout elastic breechen, $c\ c$, made of leather, or other suitable material, corresponding in width with the size of the loop-holes, and fastened to the loops either by means of screws, $f\ f$, if a single strap is used, or a buckle if a double strap is used, or otherwise affixed to the shafts.

The object of this new breeching attachment is apparent from the almost innumerable advantages to be derived therefrom, of which I beg leave to enumerate the following:

First, it supersedes and frees the horse from a considerable portion of the harness now in use, such as the back-hold, hip, and present breeching-straps; even the crupper may be readily dispensed with.

Second, it relieves the horse from the constant friction necessarily produced by the breeching, back, and hip straps now in use, which even in cold weather produces perspiration.

Third, it adds to the beauty of the horse in thus ridding him from the superfluous and cumbersome harness, and in preventing the hair on his back and legs from being worn off.

Fourth, it simplifies the harnessing and unharnessing of a horse, by superseding the buckling and unbuckling of these buckles, and the wrapping and unwrapping of the two back-hold straps, and can be attached to and detached from any shaft in less than a minute.

Fifth, it gives the horse free play of his legs in the shafts, when going down hill or turning the vehicle, not at all compressing his legs, as all other breechings do. Thus it brings about a more rational and humane treatment of the noble animal, and at the same time renders the holding back easier and safer.

Sixth, it is three times as cheap as the harness, it renders superfluous, and lasts three times as long.

Seventh, it can easily be attached to any vehicle without any alteration in the shafts or harness, and is so simple as not to be liable to get out of order.

Eighth, it can easily be shifted up and down the shaft, to suit the form of any shaft and the size of any horse. It need not be taken off at all, unless a horse of a different size is to be used.

Ninth, it stiffens and gives great strength and support to the shafts.

Tenth, it avoids the danger of a runaway horse tearing the harness and breaking the shafts and dragging the vehicle after him, when detached from the single-tree.

Eleventh, it fully answers the purpose and supersedes the use of a special kicking-strap.

Twelfth, it is of great saving and advantage to those who have no saddler near by, and have to economize in leather harness.

Thirteenth, it recommends itself for general use by its simplicity, practicability, as well as by considerations of economy and humanity.

I wish to be understood that although I have given and described what I consider the best material and form for the clasps and loops and the best combination and arrangement of the whole breeching attachment; yet I reserve for myself and assigns the right to vary and improve the same as a whole as in its different parts without giving up my title to this invention.

What I claim as my invention and desire to secure by Letters Patent, is—

1. The metallic shiftable breeching clasps and loops.

2. Their connection with each other by means of a breechen, made of leather or other suitable material, and fastened to them and the shafts by screws, buckles, or their equivalent.

3. The breechen affixed to the shafts by means of said clasps and loops, or their equivalents.

Columbus, Ohio, July 19, 1870.

WILLIAM F. SCHATZ.

Witnesses:
OTTO DRESEL,
JNO. SELTZER.